(12) United States Patent
Motoi (10) Patent No.: US 11,934,148 B2
(45) Date of Patent: Mar. 19, 2024

(54) LIGHT DIFFRACTION LAYER LAMINATED SHEET AND METHOD FOR PRODUCING CARD

(71) Applicant: Dai Nippon Printing Co., Ltd., Tokyo (JP)

(72) Inventor: Takumi Motoi, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 582 days.

(21) Appl. No.: 16/885,857

(22) Filed: May 28, 2020

(65) Prior Publication Data

US 2020/0292988 A1 Sep. 17, 2020

Related U.S. Application Data

(63) Continuation of application No. 14/442,313, filed as application No. PCT/JP2013/080608 on Nov. 12, 2013, now abandoned.

(30) Foreign Application Priority Data

Nov. 13, 2012 (JP) .................................. 2012-249650

(51) Int. Cl.
*B42D 25/45* (2014.01)
*B32B 3/04* (2006.01)
(Continued)

(52) U.S. Cl.
CPC .............. *G03H 1/0252* (2013.01); *B32B 3/04* (2013.01); *B32B 5/142* (2013.01); *B32B 7/05* (2019.01);
(Continued)

(58) Field of Classification Search
None
See application file for complete search history.

(56) References Cited

U.S. PATENT DOCUMENTS

| 4,988,151 A | 1/1991 | Moss |
| 5,267,753 A | 12/1993 | Chock |

(Continued)

FOREIGN PATENT DOCUMENTS

| DE | 69415547 T2 | 8/1999 |
| DE | 102006030865 A1 | 1/2007 |

(Continued)

OTHER PUBLICATIONS

Office Action issued in the EP Patent Application No. 17188126.1, dated Aug. 9, 2021.
(Continued)

*Primary Examiner* — Derek S. Chapel
(74) *Attorney, Agent, or Firm* — Locke Lord LLP (57) ABSTRACT

Provided are: a light diffraction layer laminated sheet which enables easy production of a card that has a light analysis structure; and a card. A light diffraction layer laminated sheet material which forms a part of a laminated structure of a card by being laminated on top of a card base material. This light diffraction layer laminated sheet material is provided with: a transparent sheet layer; a hologram layer that has a contour smaller than the contour of the transparent sheet layer and is laminated on one surface, which is the upper surface, of the transparent sheet layer; and an HS layer that bonds the transparent sheet layer and the hologram layer with each other.

19 Claims, 7 Drawing Sheets

(51) Int. Cl.

| | |
|---|---|
| *B32B 5/14* | (2006.01) |
| *B32B 7/05* | (2019.01) |
| *B32B 7/12* | (2006.01) |
| *B32B 27/08* | (2006.01) |
| *B32B 27/30* | (2006.01) |
| *B32B 27/36* | (2006.01) |
| *B42D 25/00* | (2014.01) |
| *B42D 25/29* | (2014.01) |
| *B42D 25/324* | (2014.01) |
| *B42D 25/328* | (2014.01) |
| *B42D 25/351* | (2014.01) |
| *B42D 25/369* | (2014.01) |
| *B42D 25/455* | (2014.01) |
| *B42D 25/46* | (2014.01) |
| *B42D 25/47* | (2014.01) |
| *B42D 25/475* | (2014.01) |
| *G02B 5/18* | (2006.01) |
| *G03H 1/00* | (2006.01) |
| *G03H 1/02* | (2006.01) |

(52) U.S. Cl.
CPC ............... *B32B 7/12* (2013.01); *B32B 27/08* (2013.01); *B32B 27/304* (2013.01); *B32B 27/36* (2013.01); *B32B 27/365* (2013.01); *B42D 25/00* (2014.10); *B42D 25/29* (2014.10); *B42D 25/324* (2014.10); *B42D 25/328* (2014.10); *B42D 25/351* (2014.10); *B42D 25/369* (2014.10); *B42D 25/45* (2014.10); *B42D 25/455* (2014.10); *B42D 25/46* (2014.10); *B42D 25/47* (2014.10); *B42D 25/475* (2014.10); *G02B 5/18* (2013.01); *G03H 1/0011* (2013.01); *B32B 2307/31* (2013.01); *B32B 2307/40* (2013.01); *B32B 2307/4023* (2013.01); *B32B 2307/406* (2013.01); *B32B 2307/408* (2013.01); *B32B 2307/412* (2013.01); *B32B 2307/414* (2013.01); *B32B 2307/75* (2013.01); *B32B 2425/00* (2013.01)

(56) References Cited

U.S. PATENT DOCUMENTS

| | | | |
|---|---|---|---|
| 5,688,738 | A | 11/1997 | Lu |
| 6,506,468 | B1 | 1/2003 | Morii et al. |
| 6,581,839 | B1 | 6/2003 | Lasch et al. |
| 6,722,700 | B1 | 4/2004 | Christen |
| 7,637,537 | B2 | 12/2009 | Keller et al. |
| 7,995,256 | B2 | 8/2011 | Watanabe et al. |
| 9,354,603 | B2 | 5/2016 | Motoi et al. |
| 10,173,452 | B2 | 1/2019 | Motoi et al. |
| 2002/0056990 | A1 | 5/2002 | Scheggetman et al. |
| 2003/0127847 | A1 | 7/2003 | Keller et al. |
| 2005/0230959 | A1 | 10/2005 | Nemeth |
| 2007/0008595 | A1 | 1/2007 | Watanabe et al. |
| 2008/0036195 | A1 | 2/2008 | Winchcombe |
| 2009/0280342 | A1 | 11/2009 | Minnetian |
| 2012/0286504 | A1 | 11/2012 | Oikawa et al. |
| 2014/0054882 | A1 | 2/2014 | Motoi et al. |

FOREIGN PATENT DOCUMENTS

| | | | | |
|---|---|---|---|---|
| EP | 0201323 | A2 | 11/1986 | |
| EP | 1702766 | A1 | 9/2006 | |
| EP | 2629157 | A1 | 8/2013 | |
| JP | H06-085102 | B2 | 10/1994 | |
| JP | 07-149088 | A | 6/1995 | |
| JP | 2000-172157 | A | 6/2000 | |
| JP | 2001-113863 | A | 4/2001 | |
| JP | 2001-293982 | A | 10/2001 | |
| JP | 2002-032724 | A | 1/2002 | |
| JP | 2002-079797 | A | 3/2002 | |
| JP | 2002-307879 | A | 10/2002 | |
| JP | 2003-288018 | A | 10/2003 | |
| JP | 2005-035070 | A | 2/2005 | |
| JP | 2005-103957 | A | 4/2005 | |
| JP | 2007-108206 | A | 4/2007 | |
| JP | 3131943 | U | 5/2007 | |
| WO | 98/13211 | A1 | 4/1998 | |
| WO | 01/62516 | A1 | 8/2001 | |
| WO | 2001/68383 | A1 | 9/2001 | |
| WO | 03/095218 | A1 | 11/2003 | |
| WO | 2005/108066 | A1 | 11/2005 | |
| WO | 2008/000392 | A1 | 1/2008 | |
| WO | 2012/019588 | A2 | 2/2012 | |
| WO | 2012/050223 | A1 | 4/2012 | |
| WO | 2012050223 | A1 | 4/2012 | |
| WO | 2012/118170 | A1 | 9/2012 | |
| WO | WO-2012118170 | A1 * | 9/2012 | ............. B42D 25/00 |

OTHER PUBLICATIONS

Notification of Reasons for Refusal issued in the JP Patent Application No. 2019-197290, dated Nov. 4, 2020.
International Search Report of PCT/JP2013/080608 dated Nov. 29, 2013.
Supplementary European Search Report for European Patent Application No. 13854849.0 dated May 19, 2016.
Decision of Refusal dated Apr. 4, 2017, issued to JP Application No. 2012-249650.
Extended European Search Report, of the European Patent Office, dated Oct. 9, 2015, in corresponding European Patent Application No. 12752179.7.
International Search Report, prepared by the Japanese Patent Office, acting as ISA, dated Apr. 3, 2012 in corresponding International Patent Application PCT/JP2012/055320.
Non-Final Offic Action, of the United States Patent and Trademark Office, dated Dec. 12, 2014, in corresponding U.S. Appl. No. 14/002,946.
Lippmann Hologram, on Security Holograms by Dai Nippon Printing Co., Ltd., https://web.archive.org/web/20101009230710/http://www.dnp.co.jp/international/holo/product/secu.html.
Communication of a Notice of Opposition dated Jun. 29, 2018, issued in EP Patent Application No. 13854849.0 (EP Patent No. 2921914) and English translation thereof.

* cited by examiner

LIGHT DIFFRACTION LAYER LAMINATED SHEET AND METHOD FOR PRODUCING CARD

TECHNICAL FIELD

The present invention relates to a light diffraction layer laminated sheet and a method for producing a card.

BACKGROUND ART

Hitherto, a card has been known of in which a light diffraction structure is built, such as a hologram (for example, see Patent Document 1).

However, a high manufacturing technical level was required for existing light diffraction structures, and there were a limited number of manufacturers. Furthermore, when the light diffraction structure is a Lippmann hologram, a higher manufacturing technical level was required and there were a less number of manufacturers.

Patent Document 1: Japanese Unexamined Patent Application, Publication No. 2002-32724

DISCLOSURE OF THE INVENTION

Problems to be Solved by the Invention

An object of the present invention is to provide a light diffraction layer laminated sheet by which a card having a light diffraction structure can be easily produced, and a card.

Means for Solving the Problems

The present invention solves the above-described problems with the following means. Reference numerals corresponding to those of an embodiment of the present invention are given for the sake of better understanding, but it should be noted that the present invention is not limited thereto. Also, the constituents indicated by the reference numerals may be appropriately improved, and at least some of these constituents may be replaced by the other constituents.

In a first aspect of the invention, a light diffraction layer laminated sheet (20, 20A, 220, 220A, 320, 320A) is provided, which is laminated on an upper side of a card substrate (10, 10A, 410, 410A) to form a part of a laminated structure of a card. The light diffraction layer laminated sheet includes: a transparent sheet layer (20, 20A, 220, 220A, 320, 320A); a light diffraction layer (22) configured to have an outer shape smaller than an outer shape of the transparent sheet layer and to be laminated onto an upper side which is one surface side of the transparent sheet layer; and a lower adhesive layer (21) that bonds the transparent sheet layer and the light diffraction layer together.

In a second aspect of the invention, the light diffraction layer laminated sheet according to the first aspect is provided, which further includes: a print sheet layer (30, 30A), which has been undergone printing, configured to be laminated onto the light diffraction layer (22); and an upper adhesive layer (23, 224) that is provided on the light diffraction layer, such that the light diffraction layer and the print sheet layer are bonded together.

In a third aspect of the present invention, the light diffraction layer laminated sheet according to the second aspect is provided, wherein the lower adhesive layer (21) and the upper adhesive layer (23, 224) are thermoplastic members, respectively and the upper adhesive layer is configured to have a higher temperature at which adhesiveness thereof appears than a temperature of the lower adhesive layer at which adhesiveness thereof appears.

In a fourth aspect of the present invention, the light diffraction layer laminated sheet according to the second or third aspect is provided, wherein the upper adhesive layer (23) includes a thermoplastic resin sheet, and the lower adhesive layer (21) includes a thermoplastic adhesive.

In a fifth aspect of the present invention, the light diffraction layer laminated sheet according to the first aspect is provided, which further includes a print layer (331) that is directly printed immediately on the light diffraction layer (22).

In a sixth aspect of the present invention, the light diffraction layer laminated sheet according to any one of the first to fifth aspect is provided, wherein the light diffraction layer (22) includes a Lippmann-type hologram.

In a seventh aspect of the present invention, a method for producing a card using the light diffraction layer laminated sheet according to any one of the second to fourth aspect is provided, in which the card (1, 301, 401) is produced through a multi-face layout. The method includes steps of: laminating a light diffraction layer laminated sheet material (20A, 220A, 320A), which is laminated with a plurality of light diffraction layers (22), on a substrate sheet material (10A) forming a plurality of card substrates (10, 410); and laminating a print sheet material (30A) forming a plurality of print sheet layers (30) onto the light diffraction layer laminated sheet material.

In an eighth aspect of the present invention, a method for producing a card using the light diffraction layer laminated sheet according to the fifth aspect is provided, in which the card (301) is produced through a multi-face layout. The method includes steps of: laminating a light diffraction layer laminated sheet material (30A), which is laminated with a plurality of light diffraction layers (22), onto a substrate sheet material (10A) forming a plurality of card substrates (10); and directly printing immediately on the light diffraction layer (22).

Effects of the Invention

According to the present invention, it is possible to provide a light diffraction layer laminated sheet by which a card having a light diffraction structure can be easily produced, and a card.

PREFERRED MODE FOR CARRYING OUT THE INVENTION

Hereinafter, embodiments of the present invention will be described with reference to the drawings.

First Embodiment

Figure 1A:
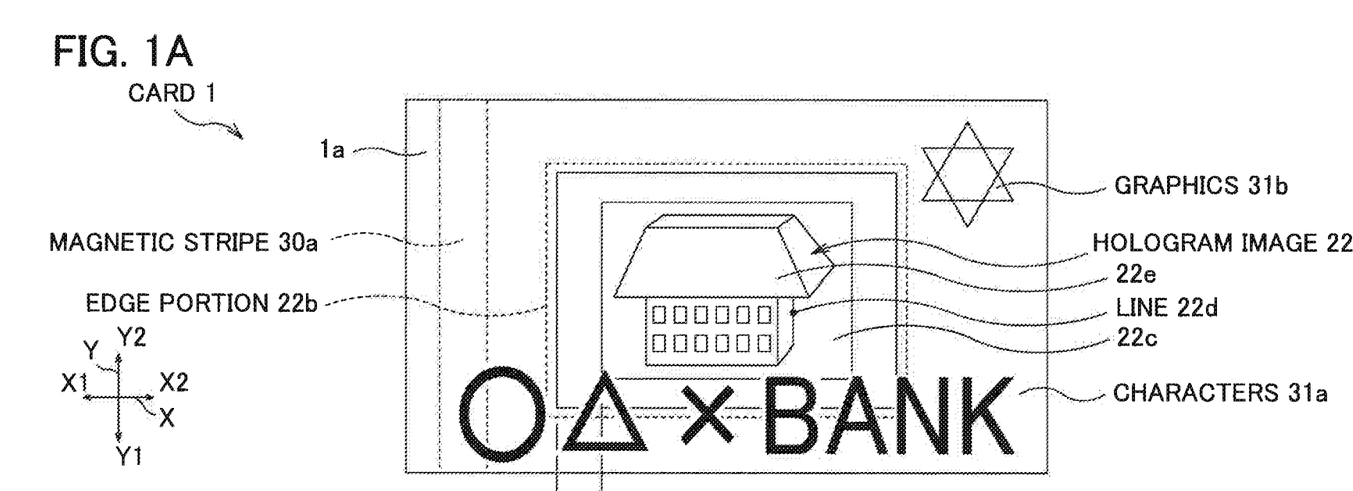
FIG. 1A and FIG. 1B are a top view and a cross-sectional view of a card 1 according to a first embodiment, respectively.
Figure 1B:
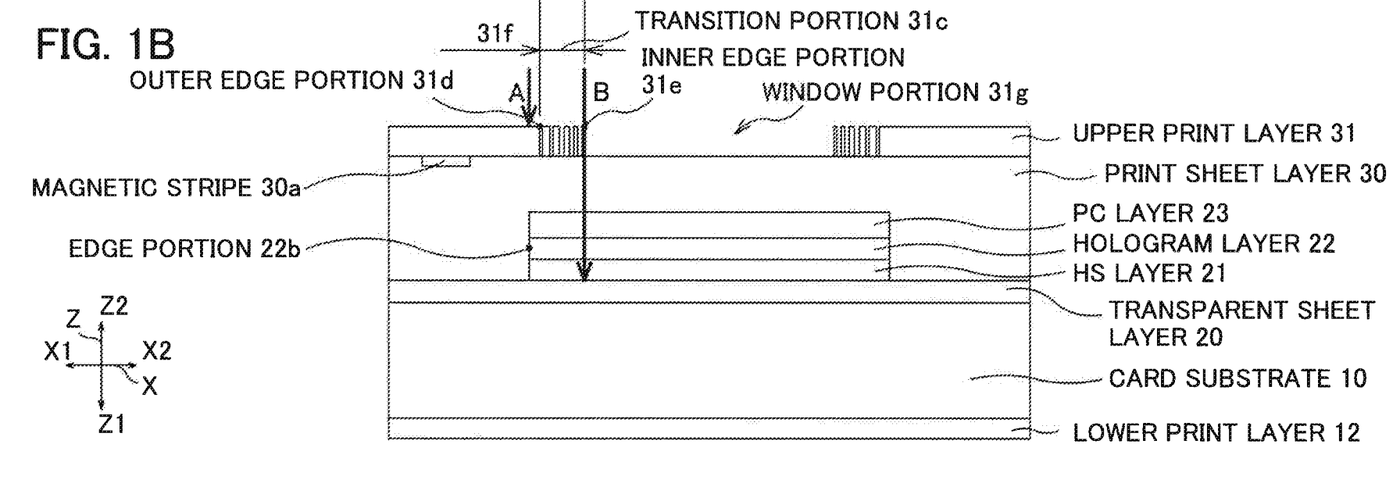

FIG. 1A and FIG. 1B are a top view and a cross-sectional view of a card 1 of a first embodiment, respectively.

FIG. 1A is a top view of the card 1 (a view illustrating a front 1a of the card when viewed in the normal direction).

FIG. 1B is a cross-sectional view of the card 1.

In the embodiments, a horizontal direction X, a longitudinal direction Y, and a vertical direction Z (thickness direction) of the card 1 are described for convenience with reference to the state illustrated in FIGS. 1A and 1B, but each direction of the card 1 can be appropriately determined depending on the arrangement. For example, when the front and the rear of the card 1 are arranged inversely to the state of FIG. 1B, in the vertical direction Z of the card 1, a lower side Z1 (lower surface side) of FIG. 1B becomes an upper side and an upper side Z2 (upper surface side) of FIG. 1B becomes a lower side. In addition, a configuration of the card in the vertical direction Z in the drawings is illustrated in an exaggerated way to clarify the configuration.

The card 1 is used as, for example, a cash card of a bank.

The card 1 includes a card substrate 10, a lower print layer 12, a transparent sheet layer 20, an HS (heat seal) layer 21 (lower adhesive layer), a hologram layer 22 (light diffraction layer), a PC layer 23 (upper adhesive layer), a print sheet layer 30, a magnetic stripe 30a, and an upper print layer 31. The transparent sheet layer 20, the HS layer 21, the hologram layer 22, the PC layer 23, the print sheet layer 30, and the upper print layer 31 are laminated in this order from a lower side Z1 to an upper side Z2 (one side) of the card substrate 10.

The card substrate 10 is a base member of the card 1. The card substrate 10 is formed of a resin sheet material such as PET, PET-G, PVC, or PC. An outer shape of the card substrate 10 is equal to an outer shape of the card 1.

A color of an upper surface of the card substrate 10 is black. A black may be a color of the card substrate 10 itself or may be a color which is printed on a substrate, the color of which is other than black.

The lower print layer 12 is provided on a lower surface of the card substrate 10.

For example, precautions for using the card are printed on the lower print layer 12.

The transparent sheet layer 20 is a transparent layer on which the hologram layer 22 is provided. The card substrate 10 is formed of a resin sheet material such as PET, PET-G, PVC, or PC. An outer shape of the transparent sheet layer 20 is equal to the outer shape of the card substrate 10.

The HS layer 21 is an adhesive layer that bonds the transparent sheet layer 20 and the hologram layer 22 together. The HS layer 21 is formed of a thermoplastic adhesive (polyester resin or the like). Since the transparent sheet layer 20 and the hologram layer 22 are bonded each other, the hologram layer 22 will beak if an attempt to peel it off is made. In this manner, even if the hologram layer 22 is illegally peeled off, the peeling will be easily found out, so it is possible to increase the security of the card 1.

The hologram layer 22 is a light diffraction layer for preventing forgery of the card 1. The hologram layer 22 is a layer having a Lippmann type hologram. The hologram layer 22 has translucency. A hologram image 22a of a building is recorded in the hologram layer 22.

The Lippmann-type hologram layer 22 is configured by applying a special polymer layer on a film (not illustrated), such as a PET substrate, to form an interference pattern due to changes in refractive index inside the polymer layer. The hologram layer 22 reproduces a hologram image via a diffraction phenomenon when light is incident on the interference pattern. The hologram layer 22 excels in the presentation of a stereoscopic effect in up and down and left and right directions, and the sense of depth. Accordingly, the hologram layer 22 brings the stereoscopic effect closer to a real object. Since the materials used and production process are unique, forgery of the hologram layer 22 is extremely difficult. Accordingly, the hologram layer 22 is more tolerant of being tampered than an emboss-type hologram, for example.

An outer shape of the hologram layer 22 is smaller than the outer shape of the card substrate 10, that is, smaller than an outer shape of the transparent sheet layer 20. That is, the hologram layer 22 is laminated only on a partial region of the card substrate 10. The reason for the partial region is to make the expensive hologram layer 22 smaller, resulting in reduced cost.

The PC layer 23, which is provided on the hologram layer 22, is a layer which bonds the hologram layer 22 and the print sheet layer 30 together. An outer shape of the PC layer 23 is equal to the outer shape of the hologram layer 22. The PC layer 23 is a thermoplastic resin sheet of PC (polycarbonate) in the embodiments. However, the type of resin is not limited to PC and may include PET, for example.

A temperature of the appearance of adhesiveness of the PC layer 23 is higher than that of the HS layer 21.

The print sheet layer 30 is formed of a resin sheet material such as PET, PET-G, or PVC. An upper surface of the print sheet layer 30 may have a mirror-like finish or a matte finish. An outer shape of the print sheet layer 30 is similar to the outer shape of the card substrate 10.

The magnetic stripe 30a is provided on the upper surface of the print sheet layer 30. Information relating to a bank account number or the like is recorded in the magnetic stripe 30a. This information can be read using a reader (not illustrated).

As illustrated in FIG. 1A, the magnetic stripe 30a is disposed outside a transition portion 31c (to be described below) of the upper print layer 31.

The upper print layer 31 is a layer printed in a black color as a background similar to that of the card substrate 10.

In addition, the upper print layer 31 is printed with characters 31a indicating the name of a bank, graphics 31b, or other necessary information (not illustrated).

The upper print layer 31 has the transition portion 31c. The transition portion 31c is a portion of gradation printing in which the color density drops progressively towards inside the gradation printing. An outer edge portion 31d of the transition portion 31c is positioned more inside than an edge portion 22b of the hologram layer 22.

The color density of the transition portion 31c becomes progressively lower, starting from 100% at the outer edge portion 31d to 0% at an inner edge portion 31e. A region 31f positioned more outside than the transition portion 31c of the upper print layer 31 has a color density equal or substantially equal to a color density of the card substrate 10.

A portion positioned more inside than the inner edge portion 31e of the transition portion 31c serves as a window portion 31g.

The transparent print sheet layer 30 is completely exposed in the window portion 31g. In this manner, an entirety of the hologram image 22a of the hologram layer 22 is visually recognizable through the window portion 31g.

The upper print layer 31 may alternatively be provided on a lower surface of the print sheet layer 30 if necessary.

Next, how the card 1 is seen from the upper side Z2 will be described.

(Vicinity of Edge Portion 22b of Hologram Layer 22)

As described above, the region 31f positioned more outside than the transition portion 31c of the upper print layer 31 has the color density equal or substantially equal to a color density of the card substrate 10. In this manner, the edge portion 22b of the hologram layer 22 is shielded and hidden by the upper print layer 31 (see an arrow A). Moreover, since the card substrate 10 and the upper print layer 31 have a black color or its family, which absorbs light, the edge portion 22b of the hologram layer 22 is hardly recognizable visually.

(Transition Portion 31c)

Only the color of the upper print layer 31 is visually recognized at the outer edge portion 31d of the transition portion 31c. Since the hologram layer 22 is transparent, the card substrate 10 becomes visually recognizable as a horizontal location moves inside from the outer edge portion 31d. Then, only the color of the card substrate 10 is visually recognizable at the inner edge portion 31e of the transition portion 31c (see an arrow B). Moreover, the upper print layer 31 and the card substrate 10 have a black color of a similar color family. In this manner, the upper print layer 31 and the card substrate 10 are visually recognized as a single seamless part.

(Window Portion 31g)

Since the upper print layer 31 is not formed on the print sheet layer 30, the hologram image 22a can be confirmed inside the window portion 31g. Since the hologram is a transparent hologram, the color of the card substrate 10 is visually recognized at regions (an external region 22c outside the building, an internal portion 22e inside the building other than a line 22d, and the like) other than the hologram image 22a of the hologram layer 22. In addition, as described above, the upper print layer 31 and the card substrate 10 are visually recognized seamlessly as a single part.

For this reason, the circumference of the hologram image 22a is seen to have a wider range of black background surface than the hologram layer 22.

In this manner, the hologram image 22a emerges from a black background, and so the hologram image 22a is seen more three-dimensionally.

The visual effect described above has been already confirmed by the production of test samples.

(Outside of Transition Portion 31c)

Since the background of the upper print layer 31 is printed in black, the internal part of the card is hidden outside the transition portion 31c. In addition, the graphic 31b or the like printed on the upper print layer 31 is seen outside the transition portion 31c. The magnetic stripe 30a is also hidden.

In this connection, the character 31a, which is printed to traverse the window portion 31g, is visually recognizable across the window portion 31g, the transition portion 31c, and the outside of the transition portion 31c. In this case, the character 31a indicating a bank is seen overlapped with the hologram image 22a inside the window portion 31g.

Figure 2:
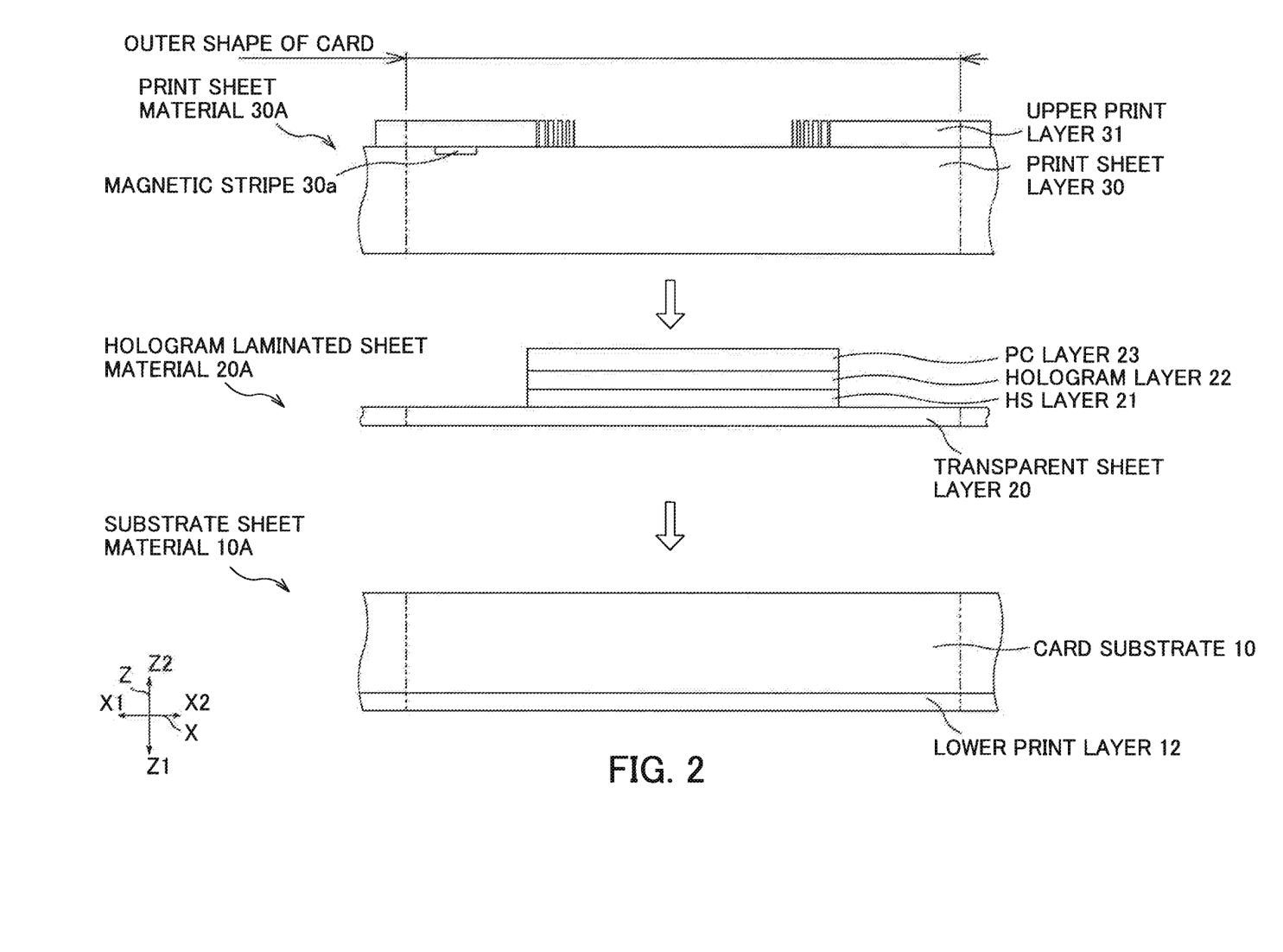
FIG. 2 is a cross-sectional view of a substrate sheet material 10A, a hologram laminated sheet material 20A, and a print sheet material 30A according to the first embodiment.

A method for producing a card 1 will be described below. FIG. 2 is a cross-sectional view of a substrate sheet material 10A, a hologram laminated sheet material 20A, and a print sheet material 30A according to the first embodiment.

Figure 3:
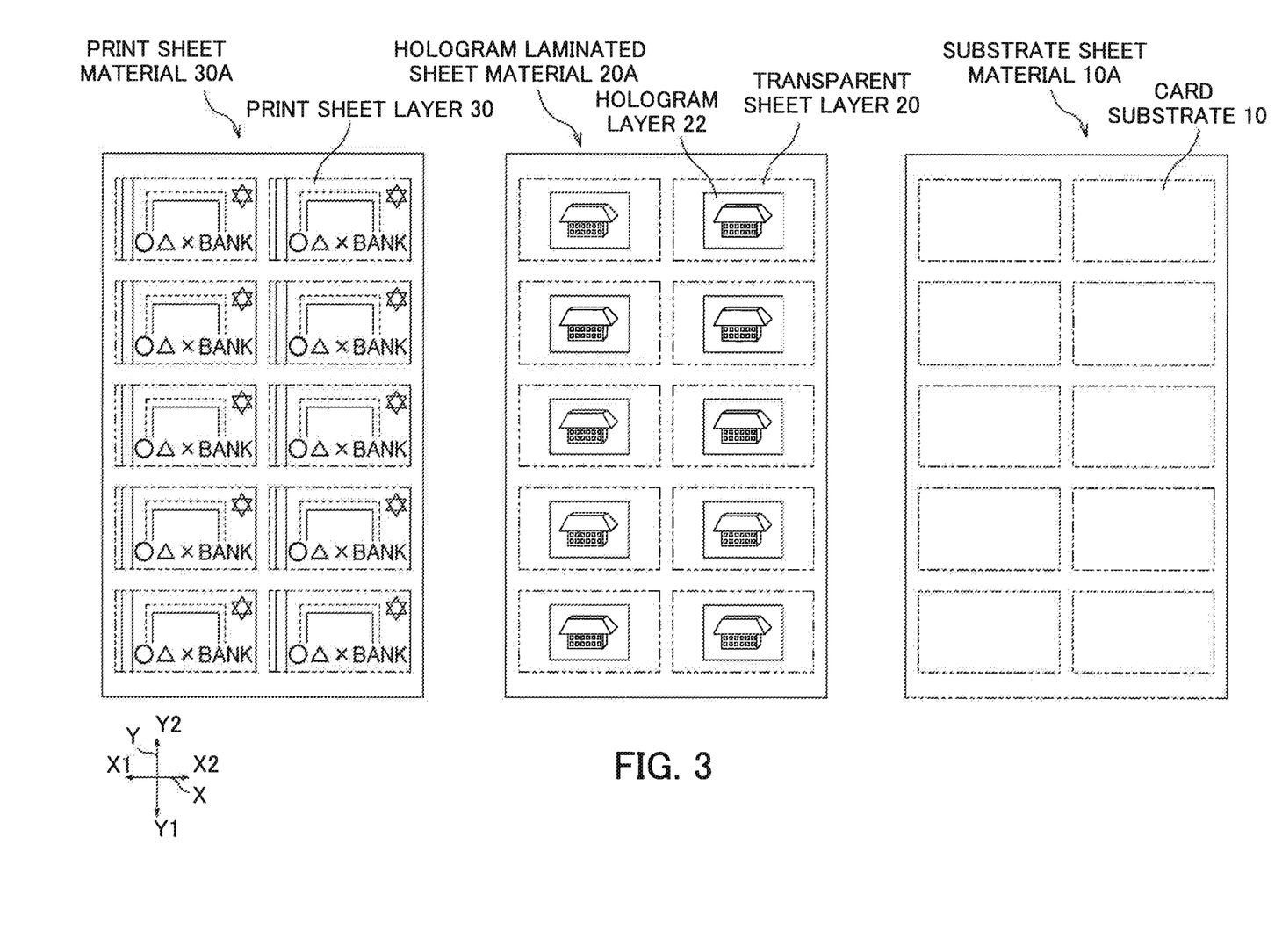
FIG. 3 is a top view of the substrate sheet material 10A, the hologram laminated sheet material 20A, and the print sheet material 30A according to the first embodiment.

FIG. 3 is a top view of the substrate sheet material 10A, the hologram laminated sheet material 20A, and the print sheet material 30A according to the first embodiment.

The substrate sheet material 10A, the hologram laminated sheet material 20A, and the print sheet material 30A are sheet materials of multi-face layout having been produced in a previous step prior to a main step. FIG. 3 illustrates an example of multi-face layout which is arranged in two rows and five columns.

First, a method for producing each of the substrate sheet material 10A, the hologram laminated sheet material 20A, and the print sheet material 30A will be described. It should be noted that the order of the following steps may be appropriately replaced with each other.

(Substrate Sheet Material 10A)

The following processes are performed on the sheet material (card substrate 10) obtained by performing black printing on a black resin sheet or a resin sheet of a color other than black.

Step of Printing Lower Print Layer 12

For example, a transfer foil provided on the PET is transferred onto a lower side Z1 of the sheet material.

Thus, the substrate sheet material 10A provided with the lower print layer 12 is produced.

(Hologram Laminated Sheet Material 20A)

(1) Step of Producing Hologram

As illustrated in FIG. 2, the hologram layer 22 is produced, the PC layer 23 is laminated onto the upper side Z2 of the hologram layer 22, and the HS layer 21 is laminated onto the lower side Z1 of the hologram layer 22.

(2) Step of Laminating Hologram

The hologram layer 22 laminated in the above step (1) is laminated onto the upper side Z2 of the transparent sheet material (transparent sheet layer 20) by heat sealing (application of heat and pressure). A temperature of the heat sealing is set within a temperature range in which the adhesiveness of the HS layer 21 appears but the adhesiveness of the PC layer 23 does not appear. In this case, since the PC layer 23 is interposed between the hologram layer 22 and a pressurizing plate for the heat sealing, the pressurizing plate and the hologram layer 22 do not come in directly contact with each other and thus the hologram layer 22 can be protected.

In this manner, the hologram laminated sheet material 20A is produced in which the HS layer 21, the hologram layer 22, and PC layer 23 are laminated onto the upper side Z2 of the sheet material.

(Print Sheet Material 30A)

(1) Step of Laminating Magnetic Stripe 30a

As illustrated in FIG. 2, the magnetic stripe 30a is laminated onto an upper surface of the transparent sheet material (print sheet layer 30).

(2) Step of Producing Print Layer

For example, a transfer foil (upper print layer 31) provided on PET is transferred to an upper surface of the sheet material provided with the magnetic stripe 30a laminated in the above step (1).

Thus, the print sheet material 30A is produced in which the magnetic stripe 30a and the upper print layer 31 are laminated.

Next, in the main step, the substrate sheet material 10A, the hologram laminated sheet material 20A, and the print sheet material 30A are processed as follows.

(1) Step of Laminating Hologram Laminated Sheet Material 20A

The substrate sheet material 10A and the hologram laminated sheet material 20A are laminated to each other using thermal welding while being heated and pressurized. These layers may alternatively be bonded each other using an adhesive or the like.

(2) Step of Laminating Print Sheet Material

The print sheet material 30A is then laminated through thermal welding while being heated and pressurized onto the upper side Z2 of the hologram laminated sheet material 20A laminated in the above step (1). These layers may alternatively be bonded each other using an adhesive or the like. In addition, the PC layer 23 is softened by a heat-sealing process, such that the hologram laminated sheet material 20A and the print sheet material 30A are bonded each other. In this case, since the PC layer 23 is softened, it is possible to prevent the hologram from suffering from damage due to the application of a pressure.

Since the PC layer 23 is a thermoplastic resin sheet, it is possible to use the PC layer 23 as not only an adhesive layer but also a protection for the hologram layer 22 against the damage due to the application of a pressure.

(3) Step of Punching

The laminated sheet materials 10A, 20A, and 30A are divided into separate pieces with an outer shape of the card by punching.

With the above-described process, the card 1 has been produced.

In the present embodiment, since the hologram laminated sheet material 20A has been produced in advance in a separate step, it is possible to produce easily the card 1 embedded with the Lippmann hologram by laminating the sheet materials 10A, 20A, and 30A.

All of steps of producing the card may be performed at a single factory. However, it may be alternatively possible that the previous steps of producing the substrate sheet material 10A, the hologram laminated sheet material 20A, and the print sheet material 30A are performed at a different factory, such that the previous steps and the main step are performed at different factories.

Here, an advanced technology is required for the production of the hologram layer 22. For this reason, it is possible to perform sharing of the steps among factories. For example, the hologram laminated sheet material 20A having the hologram layer 22 is produced at a factory having the required technology; the substrate sheet material 10A and the print sheet material 30A are produced at a different factory from the hologram laminated sheet material 20A; and the main step is also performed at a different factory from the hologram laminated sheet material 20A.

As a result of sharing of the steps, it is possible for a factory performing the main step to produce the card 1 of an end product as long as the hologram laminated sheet material 20A is available, even if the factory performing the main step does not have the technology for producing a Lippmann hologram. That is, since the card-producing step has a separate step of producing the hologram laminated sheet material 20A, it is possible to easily produce a card with the Lippmann hologram. Accordingly, this will increase the number of factories at which it is possible to produce the card 1 with the Lippmann hologram, and will contribute to the expansion of the market.

Even if the steps are shared as described above, it is possible to protect the hologram layer 22 since the hologram laminated sheet material 20A has the PC layer 23. Accordingly, the storage and handling during transportation are easy.

As described above, the separate step of producing the hologram laminated sheet material 20A facilitates the production of the card 1 of the present embodiment, which has a Lippmann hologram for which a high technique is required.

The upper print layer 31 and the card substrate 10 of black have been described as an example, but are not limited thereto. For example, the upper print layer 31 and the card substrate 10 may alternatively have any color of a similar color family. In addition, the color of the card substrate 10 or the upper print layer 31 does not matter as long as the upper print layer 31 has an effect of hiding the edge portion 22b of the hologram layer.

Second Embodiment

A second embodiment of the present invention will be described below.

It should be noted that, in the description and drawings for the following embodiments, the same reference symbol or the same reference symbol at the end (last two digits) is assigned to a portion which performs a function similarly with the first embodiment described above, and duplicated descriptions are not presented on a case-by-case basis.

Figure 4:
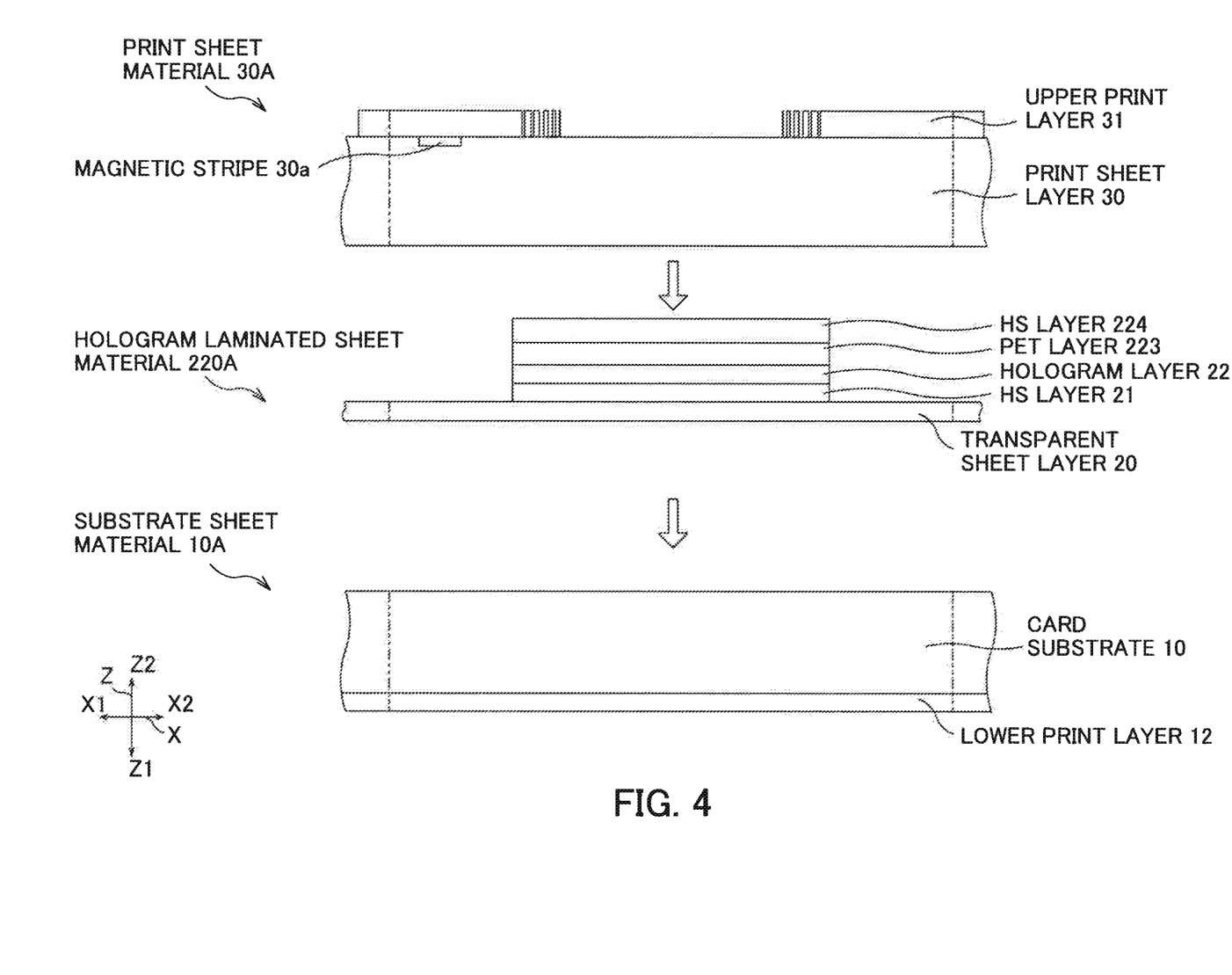
FIG. 4 is a cross-sectional view of a substrate sheet material 10A, a hologram laminated sheet material 220A, and a print sheet material 30A according to a second embodiment.

FIG. 4 is a cross-sectional view (corresponding to FIG. 2) of a substrate sheet material 10A, a hologram laminated sheet material 220A, and a print sheet material 30A according to the second embodiment.

The hologram laminated sheet material 220A is configured so that a PET layer 223 and an HS layer 224 (upper adhesive layer) instead of the PC layer 23 (see FIG. 1B) are laminated from a lower side Z1 in this order.

In a step of laminating print sheet material of a main step of producing a card, the HS layer 224 bonds the hologram laminated sheet material 20A and the print sheet material 30A by a heat-sealing process. Accordingly, for the same reason as in the first embodiment, a temperature of the appearance of adhesiveness of the HS layer 224 is higher than a temperature of the appearance of adhesiveness of the HS layer 21. That is for creating a condition under which the adhesiveness of the HS layer 21 appears, but the adhesiveness of the HS layer 224 does not appear, when the hologram layer 22 is laminated onto the transparent sheet layer 20 by heat sealing.

In addition, the PET layer 223 can prevent a hologram from suffering from the damage due to the application of a pressure.

In this manner, since the PET layer 223 and the HS layer 224 function similarly to the PC layer 23 of the first embodiment, the card of the second embodiment has the same effect as that of the first embodiment.

Third Embodiment

A third embodiment of the present invention will be described below.

Figure 5A:
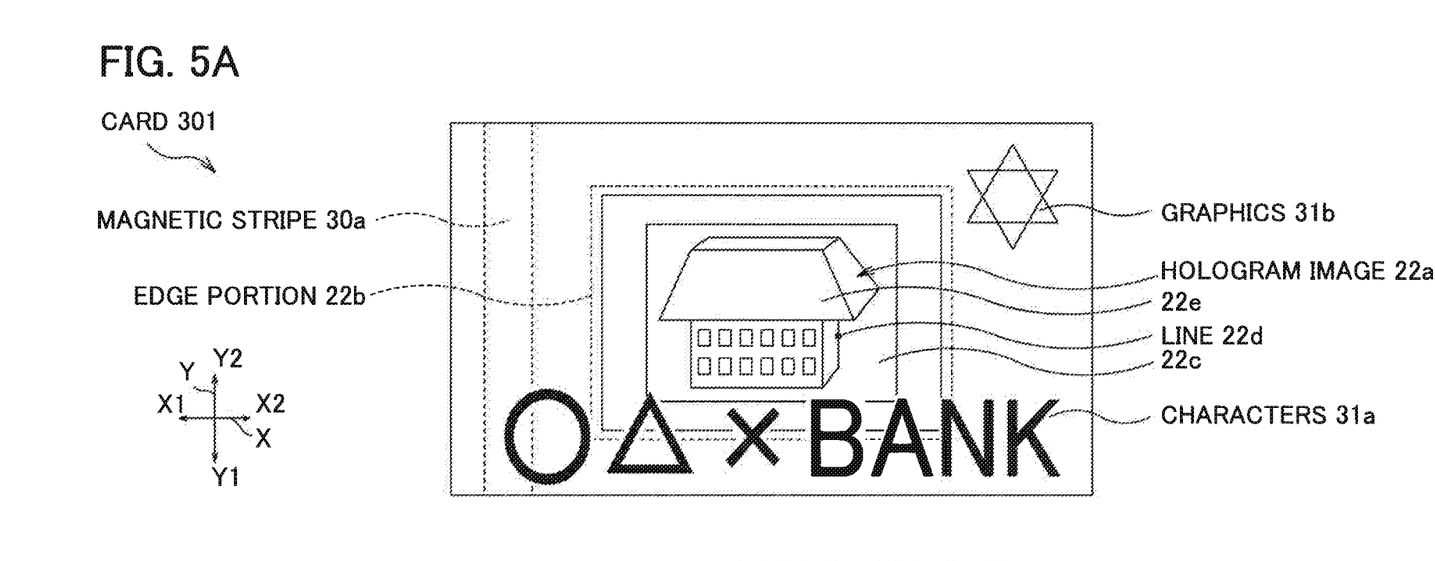
FIG. 5A and FIG. 5B are a top view and a cross-sectional view of a card 301 according to a third embodiment, respectively.
Figure 5B:
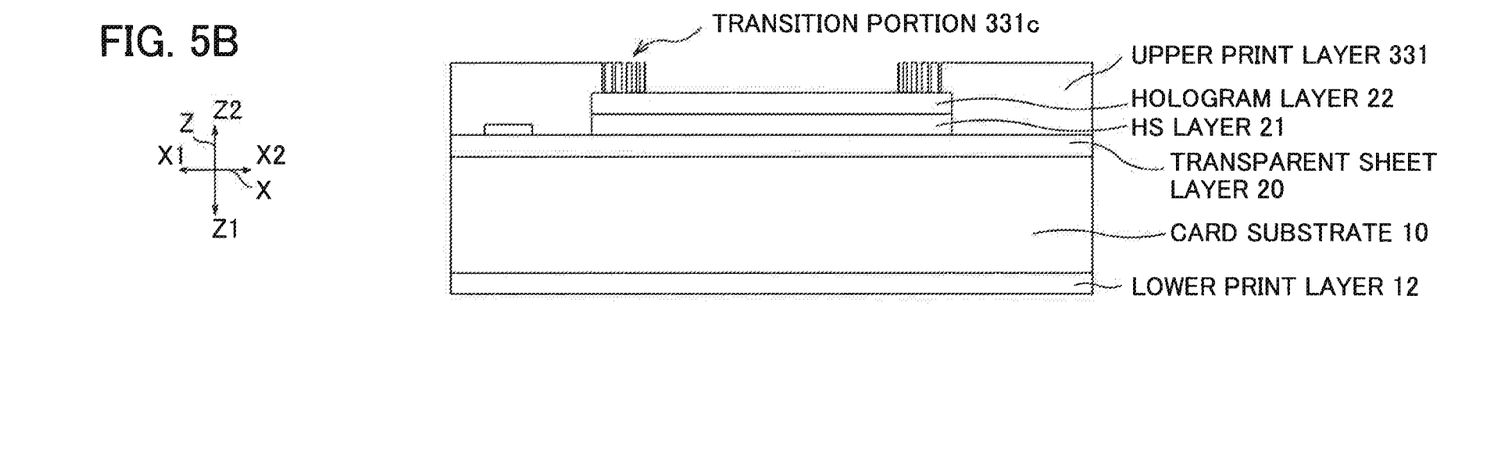

FIG. 5A and FIG. 5B are a top view and a cross-sectional view of a card 301 of the third embodiment.

Figure 6:
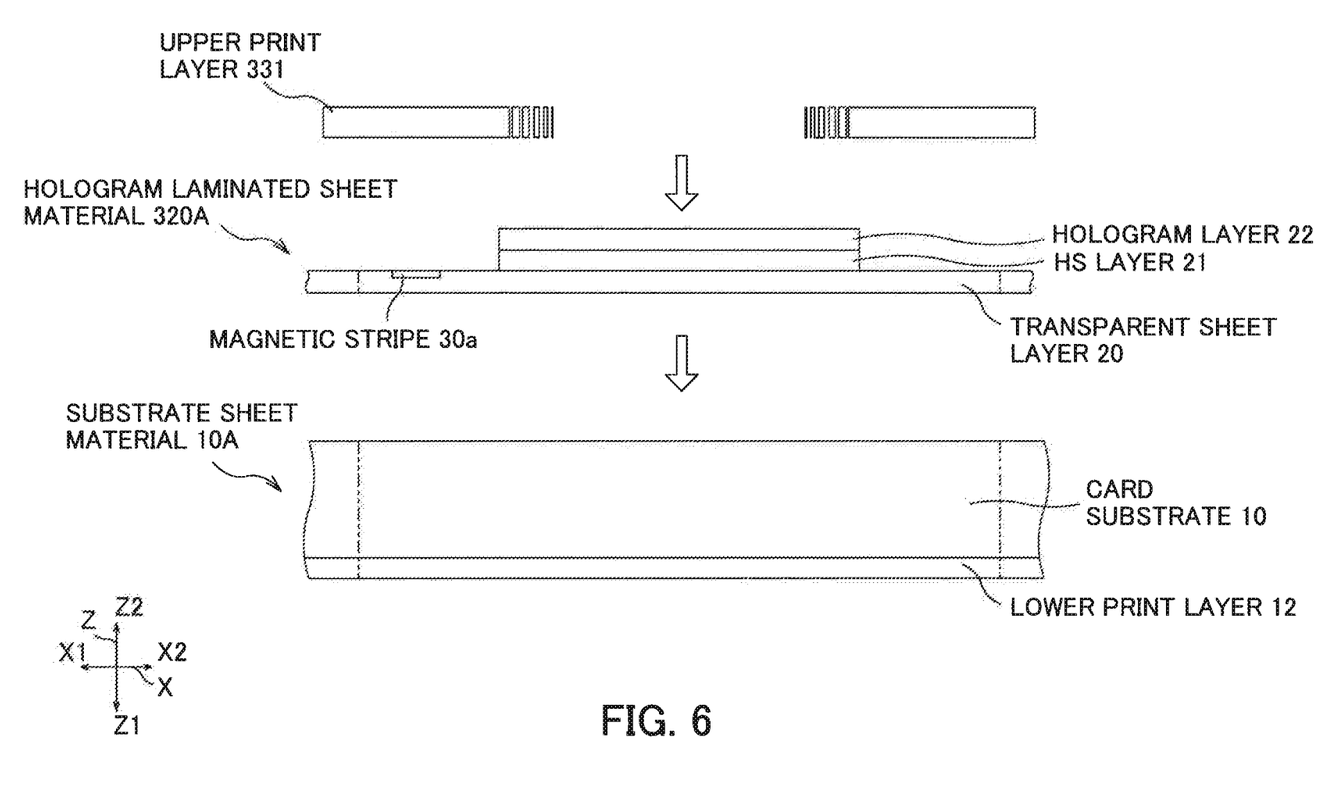
FIG. 6 is a cross-sectional view of a substrate sheet material 10A and a hologram laminated sheet material 320A of the card 301 according to the third embodiment.

FIG. 6 is a cross-sectional view of a substrate sheet material 10A and a hologram laminated sheet material 320A of the card 301 according to the third embodiment.

As illustrated in FIG. 5B, the card 301 is configured so that a PC layer 23 (see FIG. 1B) or the like is not provided on a hologram layer 22 and an upper print layer 331 is directly provided on the hologram layer 22. In addition, a magnetic stripe 30a is provided on a transparent sheet layer 20.

As illustrated in FIG. 6, the hologram laminated sheet material 320A has a simple configuration, accordingly.

The upper print layer 331 is provided using foil transfer or through a step of printing, such as silk printing.

The step of printing may be performed at a time of producing the hologram laminated sheet material 320A of the previous step or may be performed in the main step. That is, the hologram laminated sheet material 320A provided previously with the upper print layer 331 may be delivered to a factory in which the main step is performed, or the upper print layer 331 may be provided when each of the sheet materials 10A and 220A is laminated after the delivery at the factory.

As described above, the card 301 of the present embodiment is configured in such a manner that the upper print layer 331 is directly provided on the hologram laminated sheet material 320A.

Accordingly, it is possible to introduce a simple configuration, which results in low cost. In this connection, it may be alternatively possible that the card 301 is configured so that the PC layer 23 (see FIG. 1B) is provided on the hologram layer 22, similarly with the first embodiment. In this case, as in the first embodiment, it is possible to protect the hologram and suppress the damage of the hologram in the steps of heating and applying a pressure, for example, at the time of the production.

Fourth Embodiment

A fourth embodiment of the present invention will be described below.

Figure 7A:
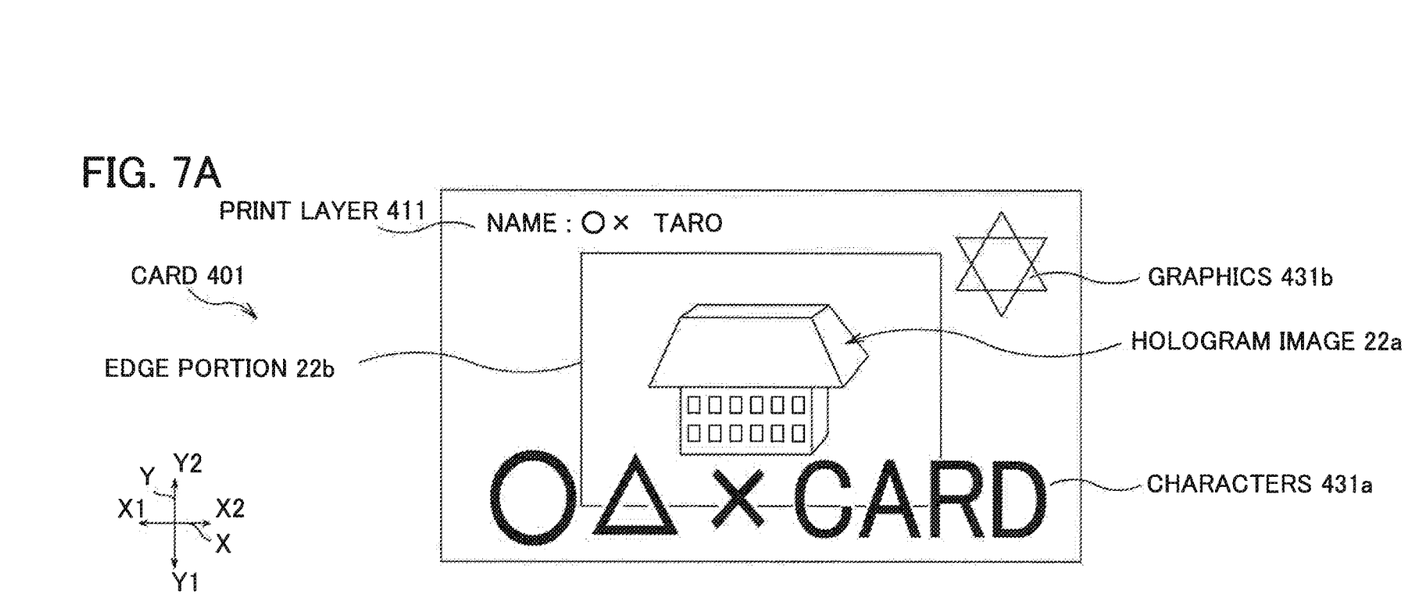
FIG. 7A and FIG. 7B are a top view and a cross-sectional view of a card 401 according to a fourth embodiment, respectively.
Figure 7B:
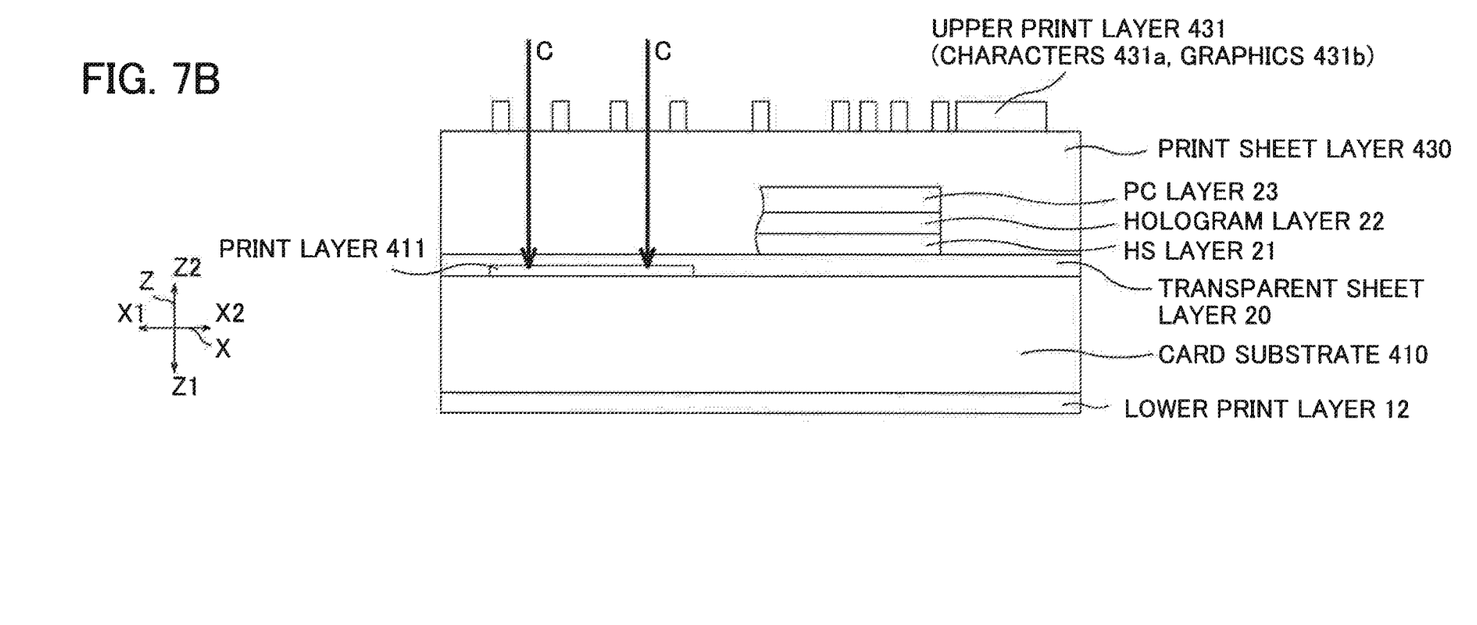

FIG. 7A and FIG. 7B are a top view and a cross-sectional view of a card 401 of the fourth embodiment.

A card substrate 410 differs from that of the first embodiment in that a print layer 411 is provided.

FIG. 7A and FIG. 7B illustrate an example in which a name of a card owner is printed on the print layer 411. It is not limited thereto, but it may be alternatively possible that a finer background, micro-printing or the like is provided thereon. Although the description is not presented, the print layer 411 is provided through printing on a substrate sheet material 10A at the time of producing the substrate sheet material 10A (see FIG. 2). The card substrate 410 may have any color in place of black.

An upper print layer 431 is not provided with a transition portion 31c and is printed with only a character 431a, a graphic 431b and the like necessary for the transparent sheet material. That is, a transparent surface is exposed at background regions except for the character 431a and the graphic 431b. Accordingly, the card substrate 410 is visually recognizable (see an arrow C), and an edge portion 22b of a hologram layer 22 is also visually recognizable.

As described above, the card 401 of the fourth embodiment, which is configured so that an upper surface of the card substrate 410 and the print layer 411 on the card substrate 410 are visually recognizable, differs from the other embodiments described above. For example, when a photograph of card owner's face is provided on the print layer 411, the card 401 is suitable for a certificate or the like.

The configuration of the fourth embodiment is also applicable to the second and third embodiments.

While the embodiments of the present invention have been described, the present invention is not limited to the above-described embodiments, and may be modified into various forms like the following modified example. The modified example will also be included in the technical scope of the present invention. Also, the effect of the embodiments is merely the preferred effect obtained from the present invention, and the effect of the present invention is not limited to the effect described in the embodiments. Furthermore, the above-described embodiments and the following modified example may be used while being appropriately combined with each other, but a detailed description thereof will not be provided.

(1) In the embodiments, the example has been illustrated in which the hologram layer is a Lippmann type hologram, but it is not limited thereto. For example, the hologram layer may alternatively be an emboss type hologram.

(2) In the embodiments, the example has been illustrated in which the transition portion does not overlap with the image portion of the hologram, but is not limited thereto. The transition portion may overlap with the image portion of the hologram and may be configured to have a less dense color as the transition portion reaches more inside the image portion. In this case, the image is seen in such a manner that the image is blurred at a periphery thereof and becomes sharper as reaching inside by the transition portion.

(3) In the embodiments, the example has been illustrated in which the card has the hologram layer, but is not limited thereto. For example, the card may be used in cash vouchers or the like.

(4) In the embodiments, the example has been illustrated in which the card is produced with the multi-face layout using the sheet materials, but is not limited thereto. The card may alternatively be produced in the form of a single body. In this case, sheet materials constituting a single card may be laminated. In this case, the transparent sheet layer itself laminated with one hologram layer may be used as the hologram laminated sheet material laminated with one hologram layer.

(5) In the embodiments, the example has been illustrated in which the printing is performed on the card substrate in the range not overlapping the hologram layer, but is not limited thereto. When the printing is performed on the card substrate so as to overlap the hologram layer, the hologram image and the printing are observed overlapped, thereby improving the design. Furthermore, in this case, it is possible to increase security since forgery becomes difficult.

EXPLANATION OF REFERENCE NUMERALS

1, 301, 401 CARD
10, 410 card substrate
10A substrate sheet material
12 lower print layer
20 transparent sheet layer
20A, 220A, 320A hologram laminated sheet material
21 HS layer
22 hologram layer
23 PC layer
30 print sheet layer
30a magnetic stripe
30A print sheet material
31, 331, 431 upper print layer
31c transition portion
31g window portion
223 PET layer
224 HS layer

The invention claimed is:

1. A light diffraction layer laminated sheet that is laminated on an upper side of a card substrate to form a part of a laminated structure of a card, the card structure comprising:
   a card substrate;
   a transparent sheet layer laminated on top of the card substrate;
   a light diffraction layer configured to have an outer shape smaller than an outer shape of the transparent sheet layer and to be laminated onto an upper side which is one surface side of the transparent sheet layer;
   a lower adhesive layer configured to have an outer shape substantially the same in size as a shape of the light diffraction layer and to directly bond the transparent sheet layer and the light diffraction layer together;
   an upper adhesive layer configured to be laminated on an upper side of the light diffraction layer and to have an outer shape substantially the same in size as the shape of the light diffraction layer;
   a single print sheet layer configured to directly surround all sides which are vertical to the transparent sheet layer for the light diffraction layer, the lower adhesive layer and the upper adhesive layer and an entire top of the upper adhesive layer, the single print sheet layer having an outer shape substantially the same in size as a shape of the outer shape of the transparent sheet layer wherein a portion of the print sheet layer above the light diffraction layer is laminated onto the light diffraction layer wherein the upper adhesive layer bonds the light diffraction layer and the print sheet layer together and wherein a portion of the print sheet layer directly above the transparent sheet layer is laminated directly onto the transparent sheet layer; and
   an upper print layer laminated on the print sheet layer between edges of the card substrate and edges of the outer shape of the light diffraction layer inside the print sheet layer,
   wherein the print sheet layer is completely exposed in an area where the upper print layer is not laminated, and
   wherein the lower adhesive layer and the upper adhesive layer are thermoplastic members, respectively and the upper adhesive layer is configured to have a higher temperature at which adhesiveness thereof appears than a temperature of the lower adhesive layer at which adhesiveness thereof appears.

2. The light diffraction layer laminated sheet according to claim 1, wherein the upper adhesive layer comprises a thermoplastic resin sheet, and the lower adhesive layer comprises a thermoplastic adhesive.

3. The light diffraction layer laminated sheet according to claim 1, wherein the light diffraction layer comprises a Lippmann-type hologram.

4. The light diffraction layer laminated sheet according to claim 3, wherein the Lippmann-type hologram is transparent.

5. A method for producing a card using the light diffraction layer laminated sheet according to claim 1,
   wherein the card is produced through a multi-face layout and the method comprising steps of:
   laminating a light diffraction layer laminated sheet material, which is laminated with a plurality of light diffraction layers, on a substrate sheet material forming a plurality of card substrates; and
   laminating a print sheet material forming a plurality of print sheet layers onto the light diffraction layer laminated sheet material.

6. The light diffraction layer laminated sheet according to claim 1, further comprising a lower print layer formed on a lower side of the card substrate opposite to the upper side of the card substrate.

7. The light diffraction layer laminated sheet according to claim 1, further comprising a print layer between the upper side of the card substrate and the transparent sheet layer such that the print layer is visible.

8. The light diffraction layer laminated sheet according to claim 1, wherein the upper print layer is printed in a color density equal or substantially equal to a color density of the upper side of the card substrate whereby the upper print layer and the upper side of the card substrate absorb light.

9. The light diffraction layer laminated sheet according to claim 1, further comprising a transition portion, being a portion of gradation printing in which a color density drops progressively towards an inside of the gradation printing, in the upper print layer located around edges of the outer shape of the light diffraction layer inside the print sheet layer.

10. A light diffraction layer laminated sheet that is laminated on an upper side of a card substrate to form a part of a laminated structure of a card, the card structure comprising:
    a card substrate;
    a transparent sheet layer laminated on top of the card substrate;
    a light diffraction layer configured to have an outer shape smaller than an outer shape of the transparent sheet layer and to be laminated onto an upper side which is one surface side of the transparent sheet layer;
    a lower adhesive layer configured to have an outer shape substantially the same in size as a shape of the light diffraction layer and to directly bond the transparent sheet layer and the light diffraction layer together; and
    a single upper print layer configured to directly surround all sides which are vertical to the transparent sheet layer for the light diffraction layer and the lower adhesive layer and a part of a top of the light diffraction layer, directly printed immediately on the transparent sheet layer between edges of the transparent sheet layer and edges of the outer shape of the light diffraction layer and the lower adhesive layer and the single upper print layer also printed so as to overlap portions of edges of the outer shape of the light diffraction layer.

11. The light diffraction layer laminated sheet according to claim 10, wherein the light diffraction layer comprises a Lippmann-type hologram.

12. The light diffraction layer laminated sheet according to claim 10, further comprising a lower print layer formed on a lower side the card substrate opposite to the upper side of the card substrate.

13. The light diffraction layer laminated sheet according to claim 10, wherein the upper print layer is printed in a color density equal or substantially equal to a color density of the upper side of the card substrate whereby the upper print layer and the upper side of the card substrate absorb light.

14. The light diffraction layer laminated sheet according to claim 10, further comprising a transition portion, being a portion of gradation printing in which a color density drops progressively towards an inside of the gradation printing, in the upper print layer located around the outer shape of the light diffraction layer.

15. A light diffraction layer laminated sheet that is laminated on an upper side of a card substrate to form a part of a laminated structure of a card, the card structure comprising:

a card substrate;

a transparent sheet layer laminated on top of the card substrate;

a light diffraction layer configured to have an outer shape smaller than an outer shape of the transparent sheet layer and to be laminated onto an upper side which is one surface side of the transparent sheet layer;

a lower adhesive layer configured to have an outer shape substantially the same in size as a shape of the light diffraction layer and to directly bond the transparent sheet layer and the light diffraction layer together;

a PET layer which has an outer shape substantially the same in size as the shape of the light diffraction layer laminated directly onto the light diffraction later;

an upper adhesive layer configured to be laminated on an upper side of the PET layer and to have an outer shape substantially the same in size as the shape of the light diffraction layer, a single print sheet layer configured to directly surround all sides which are vertical to the transparent sheet layer for the light diffraction layer, the lower adhesive layer, the PET layer and the upper adhesive layer, and an entire top of the upper adhesive layer, the single print sheet layer having an outer shape substantially the same in size as a shape of the outer shape of the transparent sheet layer wherein a portion of the print sheet layer above the light diffraction layer is laminated onto the light diffraction layer wherein the upper adhesive layer bonds the light diffraction layer and the print sheet layer together and wherein a portion of the print sheet layer directly above the transparent sheet layer is laminated directly onto the transparent sheet layer; and an upper print layer laminated on the print sheet layer between edges of the card substrate and edges of the outer shape of the light diffraction layer inside the print sheet layer, wherein a temperature of an appearance of adhesiveness of the upper adhesive layer is higher than a temperature of an appearance of adhesiveness of the lower adhesive layer.

16. The light diffraction layer laminated sheet according to claim 15, wherein the light diffraction layer comprises a Lippmann-type hologram.

17. The light diffraction layer laminated sheet according to claim 15, further comprising a lower print layer formed on a lower side of the card substrate opposite to the upper side of the card substrate.

18. The light diffraction layer laminated sheet according to claim 15, wherein the upper print layer is printed in a color density equal or substantially equal to a color density of the upper side of the card substrate whereby the upper print layer and the upper side of the card substrate absorb light.

19. The light diffraction layer laminated sheet according to claim 15, further comprising a transition portion, being a portion of gradation printing in which a color density drops progressively towards an inside of the gradation printing, in the upper print layer located around the outer shape of the light diffraction layer inside the print sheet layer.

* * * * *